United States Patent [19]
Leliaert

[11] 3,853,509
[45] Dec. 10, 1974

[54] BAG TYPE FILTER DEVICE

[76] Inventor: Raymond M. Leliaert, 3612 Brentwood Dr., South Bend, Ind. 46628

[22] Filed: May 4, 1973

[21] Appl. No.: 357,247

[52] U.S. Cl.................. 55/341, 55/378, 55/379, 55/529
[51] Int. Cl............................................. B01d 46/08
[58] Field of Search ............ 55/283, 301, 302, 303, 55/304, 341, 361, 363, 365, 378, 379, 492, 495, 498, 499, 500, 521, 529, 305

[56] References Cited
UNITED STATES PATENTS

| | | | |
|---|---|---|---|
| 2,774,443 | 12/1956 | Slavter | 55/341 |
| 2,964,127 | 12/1960 | Korn | 55/379 |
| 3,448,862 | 6/1969 | Kudlaty | 55/498 |
| 3,606,736 | 9/1971 | Leliaert et al. | 55/302 |
| 3,726,066 | 4/1973 | Leliaert et al. | 55/302 |

FOREIGN PATENTS OR APPLICATIONS

| | | | |
|---|---|---|---|
| 105,155 | 8/1942 | Sweden | 55/378 |
| 877,733 | 4/1953 | Germany | 55/500 |

Primary Examiner—Frank W. Lutter
Assistant Examiner—David L. Lacey

[57] ABSTRACT

A filter device formed of filter tubes each of which is composed of a filter bag disposed between inner and outer wire cages with the longitudinally extending wires of the inner cage extending beyond some of the longitudinal wires of the outer cage to engage the filter bag therebetween in a configured relation.

7 Claims, 7 Drawing Figures

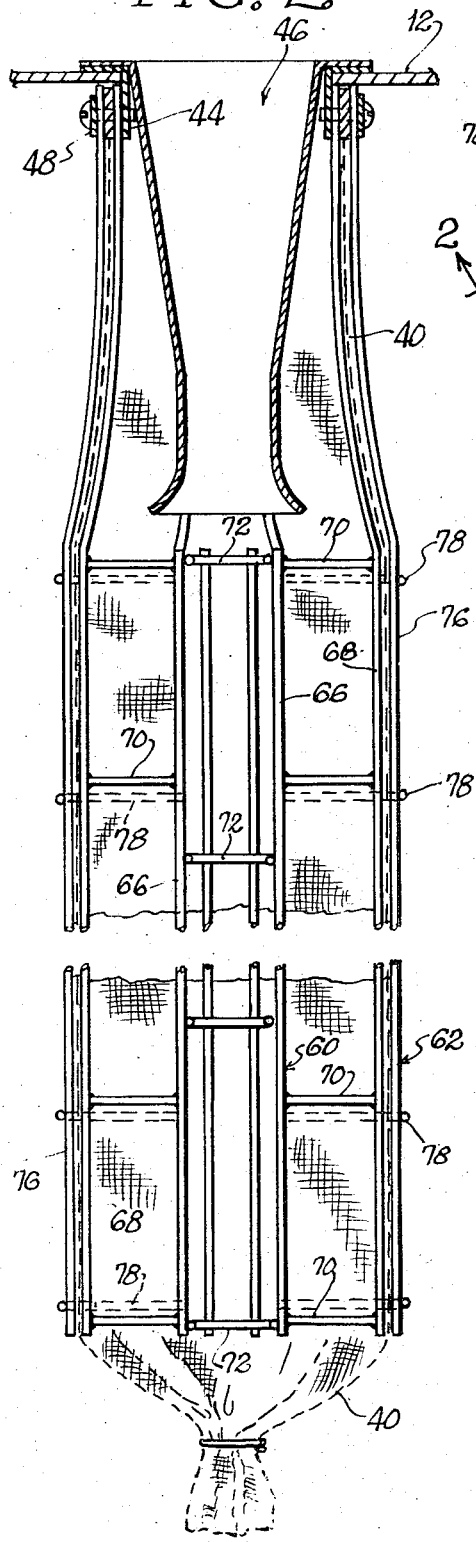
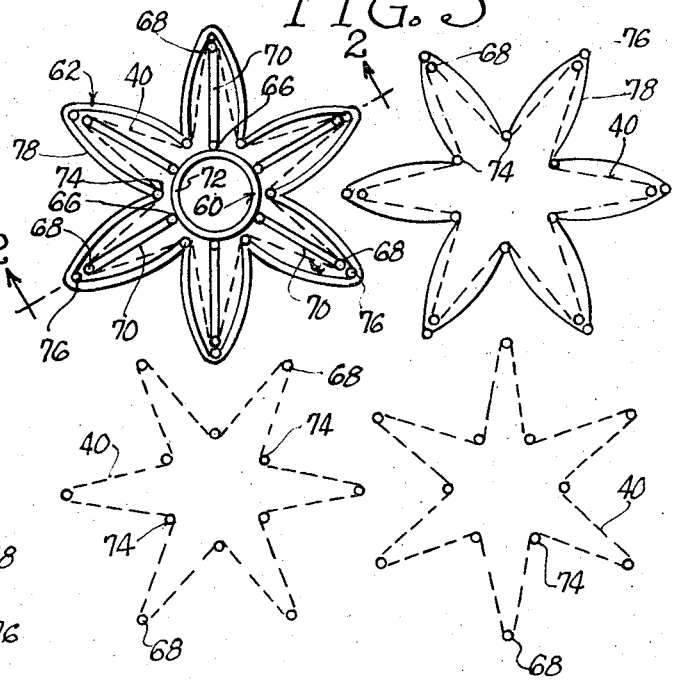
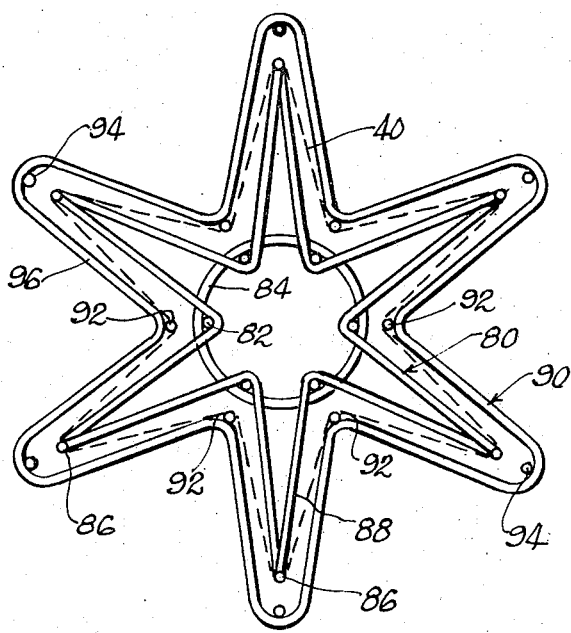

3,853,509

BAG TYPE FILTER DEVICE

This invention relates to the treatment of air, gases or other vapors for the removal of solids suspended therein and it relates more particularly to a method and apparatus for the removal of dust, dirt and the like solid particles from air, gas or vapors in which the particles are suspended.

The invention will be described with reference to a filtration device which makes use of a plurality of filter bags formed of porous filter material through which the gaseous medium is drawn, in normal filter flow, for separation of the suspended solids on the ingoing side of the filter surface, as the clean gases pass therethrough. The separated solids collect on the ingoing side of the filter surface to form a filter cake which requires occasional removal when the filter cake builds up to such thickness as to impose excessive pressure drop across the filtering medium. In the recent practice, as described in Reissue U.S. Pat. No. Re. 24,954 and, more recently, in my U.S. Pat. No. 3,606,736, the filter cake is dislodged from the ingoing side of the filter bag, preferably without stopping filter flow by a jet pulse principle wherein a short burst of high pressure gas is introduced into the open end of the filter tube to cause the filter bag to flex as the jet pulse travels along the length thereof, whereby the filter cake is dislodged from the surface.

The invention has application to conventional plenum type dust collectors which make use of a jet pulse introduced directly into the open end of the filter tube or a plenum pulse wherein the jet of high pressure gas is introduced into the clean gas plenum chamber for indirect communication with all of the filter tubes exhausting into the chamber.

The capacity of a filter device of the type described is governed somewhat by the filter area available for dust and dirt removal before the pressure drop builds up an amount which requires a cleaning cycle for filter cake removal. In order to build up capacity or a lower pressure drop across the filter fabric, it has been common practice to increase the number of filter tubes or the size thereof in the particular filter system. Such increase in the number of tubes or their size introduces a number of undesirable factors, such as the requirement for increased space, increased cost of materials, and increased material handling, equipment and maintenance.

It is an object of this invention to provide a means for increasing the capacity or reducing the pressure drop in a bag type filter system of the type described, without increase in the space requirements and to provide for increased filter surface area without increase in size of the filter device.

These and other objects and advantages of this invention will hereinafter appear and for purposes of illustration, but not of limitation, embodiments of the invention are shown in the accompanying drawings, in which:

FIG. 2 is a sectional elevational view showing the arrangement of elements in a bag type filter embodying the features of this invention;

FIG. 3 is a cross sectional view of a filter unit representing one modification of this invention;

FIG. 3a is a sectional view of the star arrangement of FIG. 2 but with a modification in the support system;

Figure 1A:
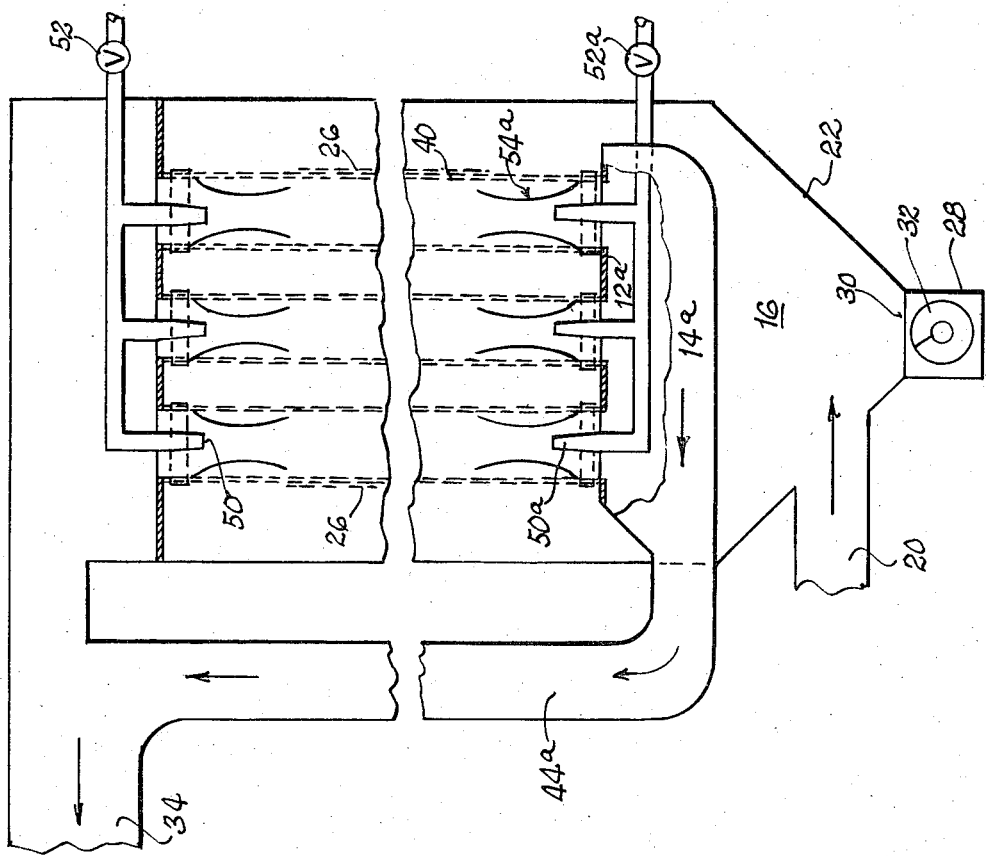
FIG. 1a is a schematic elevational view similar to that of FIG. 1 showing a modification in the filter section.
Figure 1:
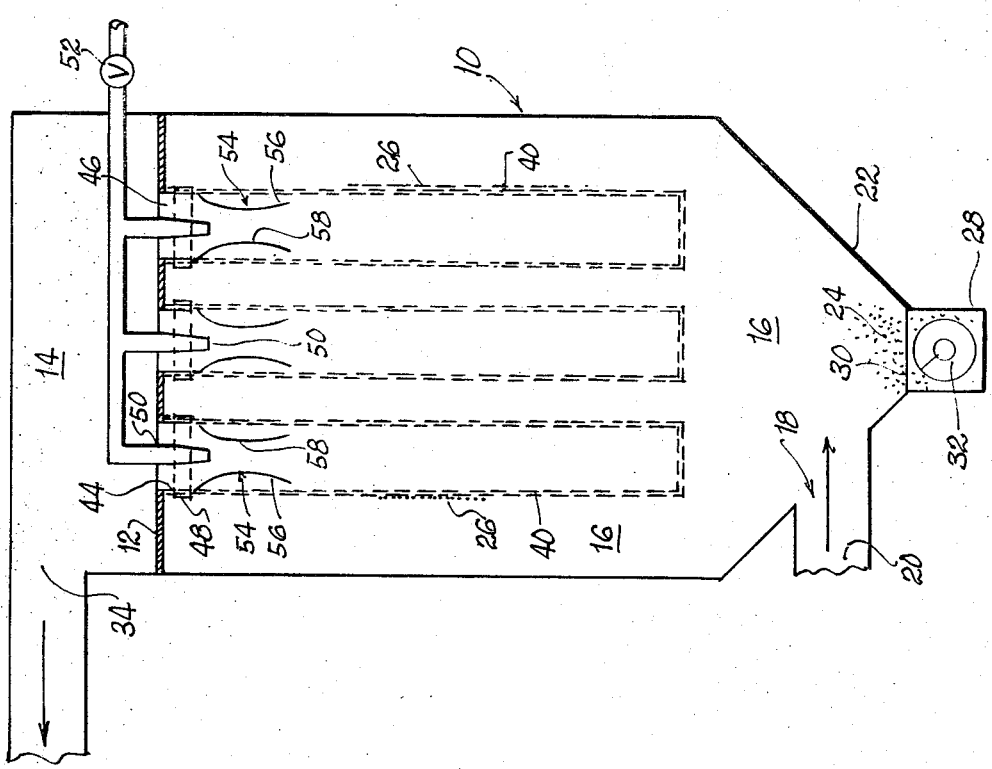
FIG. 1 is a schematic elevational view of the interior of a bag type filter system.

As illustrated in FIG. 1, the filter apparatus comprises an enclosed filter housing 10 which is subdivided by a horizontally disposed cell plate 12 into an upper clean gas plenum chamber 14 and a lower dirty gas plenum chamber 16 into which the gaseous material 18 is introduced through an inlet 20 in communication with the interior of the dirty gas plenum chamber 16. The lower end of the portion of the housing 10, defining the inlet plenum chamber 16, is formed with a hopper portion 22 for collection of the solid particles 24 which fall gravitationally when the filter cake 26 is dislodged from the ingoing side of the filter elements, hereinafter to be described. The hopper terminates in a trough 28 having a removable cover 30 and a screw conveyor 32 by which the solids collected in the trough 28 are removed from the apparatus. Other means such as a rotary air lock and the like may be used for removal of the collected solids.

An outlet 34 communicates with the clean gas plenum chamber 14 for the exhaust of clean gas into the atmosphere or for other processing. An exhaust fan (not shown) communicates with the clean gas plenum chamber 14 through the outlet 34 to effect subatmospheric conditions within the portions of the clean gas plenum chamber 14 in communication with the outgoing side of the filter elements whereby dirty gas is drawn through the inlet 20 into the dirty gas plenum chamber 16 for flow through the filter tube whereby the solids are separated from the gas on the ingoing side as the filtered gas passes therethrough.

Suspended within the dirty gas plenum chamber 16 are one or more vertically disposed filter elements 40, in the form of elongate porous members, such as stockings or filter bags preferably formed of a filter fabric, such as cotton, silk, hemp or other natural fibers, or of glass, asbestos or the like inorganic fibers, or of Orlon, Dacron and the like man-made fibers, or preferably combinations thereof. It is preferred to fabricate the filter bag of fibrous fabrics which are characterized by good wear resistance, good chemical resistance, and of fibers which are resistant to high temperatures so as to enable use in the treatment of gases exhausted at elevated temperatures from such operations as cement plants, aluminum plants, heat generating plants, electrical generating plants and other plants in which materials are processed and wherein dust or fumes might be generated.

Each filter tube 40 is removably suspended from the cell plate 12 by a tubular section 44 fixed to the bottom side of the cell plate 12 in communication with an outlet opening 46 through the cell plate. The tubular member 44 is dimensioned to receive the open end portion of the filter tube 40 in telescoping relation and is secured thereto, as by means of a clamp 48.

In the jet pulse arrangement illustrated in FIG. 1, a source of primary gas, in the form of a nozzle 50 extends downwardly through the open end of each filter tube and is connected at its upper end to a source of high pressure primary gas with suitable valve means 52 for regulating the frequency and duration of burst of the high pressure primary gas from the nozzle 50. Concentrically arranged about the nozzle 50 is a venturi section 54 which operates to provide an annular space between the nozzle 50 and the venturi section 54 which communicates with the clean gas plenum chamber for flow of secondary gas therethrough.

The venturi section 50 is provided at its lower end with a diverging section 56 axially aligned with the nozzle 50 but with a passage through the throat 58 being of larger dimension than the orifice 50 and spaced therefrom by an amount to enable the spreading comb of jet of primary gas, issuing from the nozzle 50, to flow into close proxmity to the interior wall of the venturi throat to generate a pumping action as the burst of gas issues from the orifice 50. Thus the secondary gas is drawn through the annular space to supplement the primary gas and generate a burst having greater force and effect for passage downwardly as a jet pulse through the bag.

To the present, description has been made of the construction, which is now common place for filter cake removal, of a conventional bag type filter in which the filter bag of filter fabric is fitted, as a stocking, over an open wire cage to form a filter tube, a number of which are employed in one or more filter chambers and in which use is made of the jet pulse described or a plenum pulse for filter cake removal. In the plenum pulse arrangement, one or more nozzles can be located in the clean gas plenum chamber for generation of a jet pulse which enters the open end of the filter tubes for passage downwardly therethrough in a manner to cause flexing of the bags for dislodging the filter cake.

In accordance with the general concepts of this invention, as illustrated in FIGS. 2 to 5, use is made of an inner cage 60 and an outer cage 62 which cooperate one with the other to support the filter bag 40 therebetween in a corrugated configuration of various shapes and design. The inner cage provides support to prevent collapse of the filter bag during the normal filter cycle or filter mode, while the outer cage 62 provides support to limit outward travel of the filter bag during the pressure pulse of the cleaning cycle.

While the invention is not limited to dimensional characteristics of the filter tube or the spacing between tubes, reference will be made to dimensional characteristics of elements employed in a conventional filter section, for purposes of illustrating the merits of this invention. Conventionally, a filter section is formed of a plurality of tubular filter members, each formed of an inner cage and filter bag, arranged on 8 inch centers, with the cage and filter bag having a diameter of about 6 inches to provide for proper spacing between the plurality of filter tubes.

Figure 4:
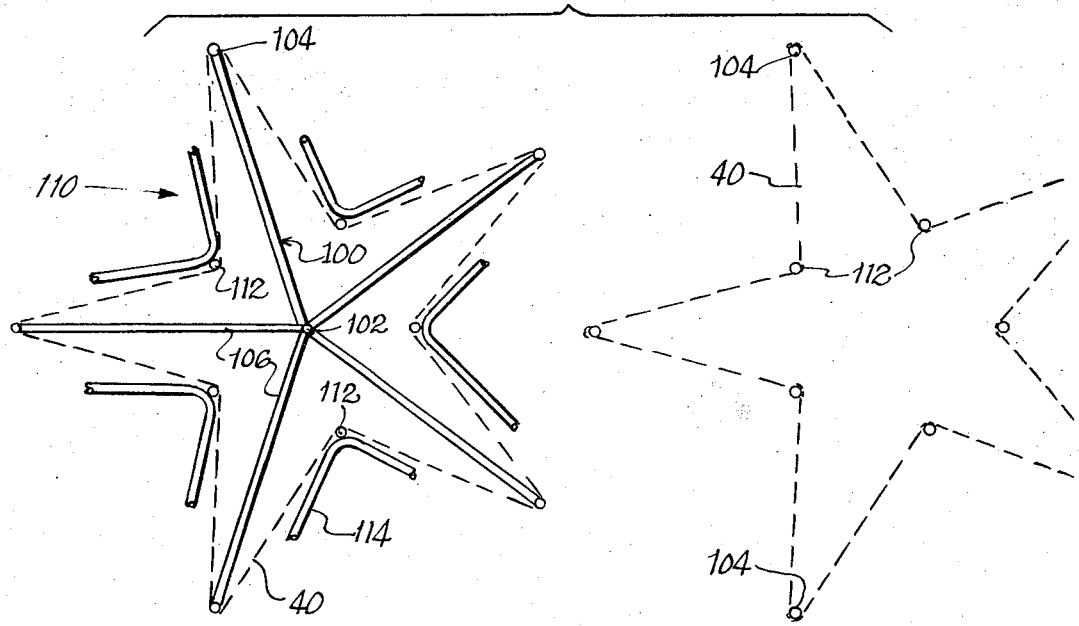
FIG. 4 is a sectional view similar to that of FIG. 2 showing another modification.
Figure 5:
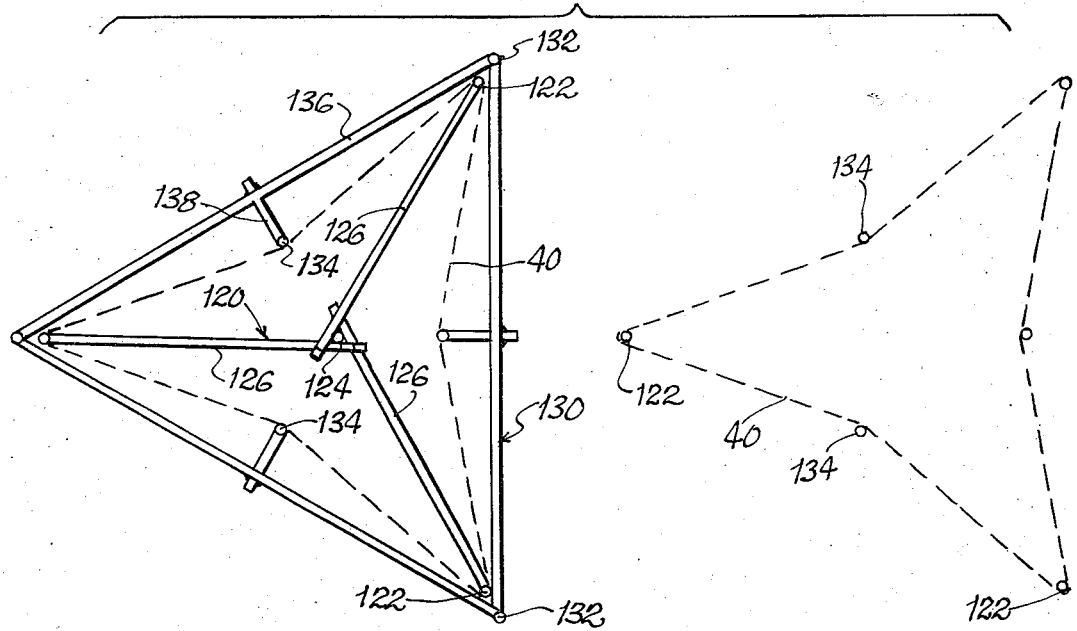
FIG. 5 is a sectional view similar to those of FIGS. 3 and 4 showing a still further modification.

With the same 8 inch spacing between filter tubes, in utilization of the star designs of FIGS. 3, 4 and 5, the outer points of the inner cage can be increased to 4 inches from the center while the inner points for the outer cage can be 1 to 1½ inches from the center while still providing adequate space between the filter tubes, especially when the filter tubes are of the star design with the outer points of one tube telescoping to extend into the recessed portion of adjacent tubes, whereby a proper spaced relationship is maintained therebetween.

Thus, in the six point star configuration which is illustrated in FIG. 3, the effective filter surface, by comparison with a conventional round tubular structure on the same centers, is increased from 1.57 square feet of filter area per foot of length to 2.81 square feet of filter area per foot of length with the star design.

With the five pointed star configuration of FIG. 4, using 8 inch centers, the filter area is increased from 1.57 square feet for the conventional tubular member of round configuration to 2.5 square feet of filter area per foot of length in the five star design.

With the three pointed configuration of FIG. 5, on 8 inch centers, using a 3 inch radius for the outer tips of the inner cage and a 1½ inch radius for the inner tips of the outer cage, the filter area is increased per foot of length from the 1.57 square feet per foot of length for the conventional round filter tube 1.75 square feet per foot of length for the triangular arrangement.

It will be understood that other shapes controlled by cooperation between the inner and outer cages can be employed, such as rectangular, square or oval shapes, but preferably shapes embodying a star design having 3, 4, 5, 6, 8 or more points to increase the effective filter surface per unit area of space.

In the modification shown in FIGS. 2 and 3, the inner cage is formed of pairs of circumferentially spaced apart inner and outer radially spaced, longitudinally extending wires 66 and 68, respectively. The inner wires 66 are secured in the desired circumferential relation to longitudinally spaced apart rings 72. The outer wires 68 are maintained in their desired spaced relation by rigid cross wires 70 which extend radially from the inner wires 66 to the outer wires 68, with the wires 66 and 68 secured to the opposite ends thereof. The outer longitudinally extending cage wires 68 extend longitudinally beyond the inner wires to the tubular member 44 for attachment thereto, as by means of the clamp 48.

The outer cage 62 comprises circumferentially spaced apart pairs of inner and outer longitudinally extending wires 74 and 76, respectively, with the outer wires 76 radially aligned with the wires 66 and 68 of the inner cage, but on a circle of larger diameter than the circle defined by the outer wires 68 of the inner cage, and with the inner wires 74 of the outer cage circumferentially offset to about midway between the wires 76 and on a circle of lesser diameter than the circle defined by the outer wires 68 of the inner cage, but of larger diameter than the circle defined by the inner wire 66 of the inner cage.

The outer wires 76 of the outer cage are secured in their circumferentially spaced relation by longitudinally spaced star ring members 78, while the inner wires 74 of the outer cage are secured to the same wires 78 which extend radially from the outer star ring member 78 to the longitudinally extending inner wires 74. The outer wires extend to the tubular member 44 for attachment thereto, as by clamp 48.

The filter bag 40 extends in corrugated fashion outwardly between the outer wires 68 and 76 of the inner and outer cages and inwardly between the wires 66 and 74 of the inner and outer cages with the upper end portion of the filter bag 40 clamped onto the tubular member 44.

In FIG. 3a, the star configuration is achieved by an inner cage 80 and an outer cage 90, with the filter bag 40 disposed therebetween. The inner cage is formed with longitudinally extending, circumferentially spaced inner wires 82, joined by longitudinally spaced apart ring members 84. Included are longitudinally extending, circumferentially spaced apart outer wires 86 which are maintained in position by longitudinally spaced, horizontally disposed wire spiders 88 that weave back and forth between the inner and outer wires 86 and 82, respectively. The outer wires 86 extend up to the tubular member 44 for support of the inner cage.

The outer cage 90 is also formed of inner longitudinally extending, circumferentially spaced wires 92 arranged midway between the wires 86 and radially aligned with the wires 82, and outer longitudinally extending, circumferentially spaced wires 94, radially aligned with the wires 86 of the inner cage. Longitudinally spaced, horizontally disposed wires 96 weave back and forth to interconnect the inner wires 92 and the outer wires 94, with the outer wire 94 extending to the tubular member 44 for support. The filter bag 40 is draped between the inner and outer cages 80 and 90 and conforms to the corrugated configurations therebetween. It will be seen that the diameter of the circle formed by the outer wires 94 of the outer cage 90 is slightly greater than the circle formed of the outer wires 86 of the inner cage 80 and that the diameter of the circle formed of the inner wires 92 of the outer cage 90 is slightly greater in diameter than the circle formed of the inner circle 82 of the inner cage 80 to form the corrugated spaced relation therebetween.

In the modification shown in FIG. 4, use is made of an inner wire cage 100 and an outer wire cage 110. The inner wire cage 100 is formed of a longitudinally extending central wire 102 and a plurality of longitudinally extending, circumferentially spaced outer wires 104, periodically joined to the inner wires 102 by vertically spaced radial wires 106. The outer wires 104 extend to the clamp 48 for support.

The outer cage 110 is formed of a plurality of longitudinally extending, circumferentially spaced apart inner wires 112 which extend to the clamp for support, and with the loop wires 114 connected to the inner wires 112 in vertically spaced relation to engage the outer walls of the bag 40, adjacent the inner wires, for support. The filter bag 40 extends in corrugated fashion about the outer ends of the outer wires 104 of the inner cage and about the inner ends of the inner wires 112 of the outer cage.

In FIG. 5, use is again made of an inner wire cage 120 and an outer wire cage 130. The inner wire cage is formed with longitudinally extending, circumferentially spaced apart outer wires 122 and longitudinally extending central wire 124. The outer wires 122 are joined to the inner wire 124 by horizontally disposed connecting wires 126. The outer wires extend upwardly to the clamp for support.

The outer cage 130 is formed of longitudinally extending, circumferentially spaced wires 132 radially aligned with the wires 122 and longitudinally extending, circumferentially spaced wires 134 intermediate the wires 132 and spaced inwardly therefrom. The inner and outer wires are connected by vertically spaced apart frame wires 136 extending between the adjacent outer wires with a cross wire 138 extending from the frame wire to the inner wire 134. The outer wires or the inner wires can extend upwardly to the clamp for support.

The bag 40 extends about the outer ends of the outer wires 122 of the inner cage and about the inner ends of the inner wires 134 of the outer cage to provide the desired bag arrangement.

In operation, during normal filter flow, gas is exhausted from the clean air plenum chamber 14, creating subatmospheric conditions which draws dirty gas to be cleaned through the inlet 18 into the dirty air plenum chamber 16 and through the filter bags for separation of solids, by filtration, on the outer ingoing side of the filter bag, while the filtered gas passes therethrough. The inner cage prevents collapse of the filter bag during the normal filter cycle while holding the bag to the desired configuration in cross section.

When the pressure drop across the filter surface becomes excessive, the cleaning cycle is initiated by a short burst of high pressure gas from the jet nozzle 50, without shutting off the filter cycle. This burst of high pressure gas travels longitudinally down the interior of the filter tube to cause flexure of the filter bag sufficiently to dislodge the filter cake of separated solids collected on the outside of the filter bag. The outer cage operates, during the cleaning cycle, to hold the bag in the desired configuration while the filter cake is being dislodged from the surface and falls down gravitationally to the hopper 22 for removal by the screw conveyor 32.

Thus the filter cake is removed from the ingoing side of the filter bag and the normal filtering operation continues with cleaned bags, having less pressure drop across the filter surface.

By way of modification, more efficient utilization of the filter surface, as evidenced by more uniform buildup of the filter cake on the ingoing sides of the filter tubes, can be achieved when the jet pulse is introduced from the bottom end as well as the top end of the filter tube. For this purpose, the arrangement described at the upper end of the filter tube for introducing the jet pulse is repeated at the lower end, with a clean air plenum chamber $14^a$ in communication with the lower open ends of the filter tubes 40, via openings in the cell plate $12^a$. The clean air plenum chamber $14^a$ is connected through ducts $44^a$ to the clean air exhaust 34 for the withdrawal of filtered gas from both ends of the filter tubes. As in the arrangement at the upper ends of the filter tubes, a nozzle $50^a$ extends upwardly through the open end of each of the filter tubes for the introduction of a short burst of gas from the source of high pressure gas, as controlled by valve $52^a$. Concentrically arranged about the nozzle $50^a$ is a venturi section $54^a$, having an annular space thereabout for flow of secondary gas from the clean gas plenum chamber $14^a$ into the filter tube, as previously described.

Because of the increased filter area per unit space, which is achieved in accordance with the practice of this invention, the capacity of the filter unit is markedly increased and/or the pressure drop is decreased without increase in filter space, thereby markedly to increase the efficiency as well as the utility of the filter unit.

It will be understood that instead of introducing the short burst of high pressure gas directly into the venturi in the end portion of the filter tube, the short burst of high pressure gas may be introduced into the clean air plenum chamber for communication with the open end of each of the filter tubes to effect removal of the filter cake collected on the surfaces thereof.

It will be understood that changes may be made in the details of construction, arrangement and operation, without departing from the spirit of the invention, especially as defined in the following claims.

I claim:

1. In a bag type filter device having a filter housing with an inlet for passage of dirty gas to be cleaned into the housing and an outlet for passage of clean gas from the housing, a cell plate subdividing the housing into a clean gas plenum chamber in communication with the outlet and a dirty gas plenum chamber in communication with the inlet, with openings through the cell plate communicating the dirty gas plenum chamber and the clean gas plenum chamber, filter tubes extending into the dirty gas plenum chamber with an open end in communication with openings in the cell plate and closed at the other end, the improvement in which the filter tube comprises a filter bag, an inner wire cage and an outer wire cage with the filter bag disposed in between, with the inner wire cage having a plurality of circumferentially spaced rigid outer wires extending in the longitudinal direction and with the outer cage having a plurality of circumferentially spaced inner and outer wires also extending in the longitudinal direction, with outer wires of the inner cage positioned a greater distance from the center of the filter tube than inner wires of the outer cage but less than the outer wires of the outer cage with the outer wires of the outer cage being substantially radially aligned with the outer wires of the inner cage, with the said outer wires of the inner cage and the inner wires of the outer cage being circumferentially offset one from the other, the filter extending sequentially outwardly about the outer wires of the inner cage and inwardly about the inner wires of the outer cage to support the filter bag therebetween in a corrugated arrangement.

2. A filter device as claimed in claim 1 in which the inner and outer cages conform the filter bag to star shape.

3. A filter device as claimed in claim 2 in which the inner cage has five outer wires and the outer cage has five inner wires and the filter bag is maintained between the inner and outer cages in a five pointed star.

4. A filter device as claimed in claim 2 in which the inner cage has six outer wires and the outer cage has six inner wires and the filter bag is maintained between the inner and outer cages in a six pointed star.

5. A filter device as claimed in claim 1 in which the longitudinal inner wires of the outer cage are located about midway between the adjacent longitudinal outer wires of the inner cage.

6. A filter device as claimed in claim 1 in which the filter tubes are arranged on about 8 inch centers with the longitudinal outer wires of the inner cage spaced 3 to 4 inches from the center and the longitudinal inner wires of the outer cage spaced about 1 to 1½ inches from the center.

7. In a bag type filter device having a filter housing with an inlet for passage of dirty gas to be cleaned into the housing and an outlet for passage of clean gas from the housing, a cell plate subdividing the housing into a clean gas plenum chamber in communication with the outlet and a dirty gas plenum chamber in communication with the inlet, with openings through the cell plate communicating the dirty gas plenum chamber and the clean gas plenum chamber, filter tubes extending into the dirty gas plenum chamber with an open end in communication with openings in the cell plate and closed at the other end, the improvement in which the filter tube comprises a filter bag, an inner wire cage and an outer wire cage with the filter bag disposed in between, with the inner wire cage having a plurality of circumferentially spaced rigid outer wires extending in the longitudinal direction relative to the filter tube and with the outer cage having a plurality of circumferentially spaced inner wires also extending in the longitudinal direction, with the outer wires of the inner cage positioned a greater distance from the center of the filter tube than the inner wires of the outer cage, with the outer wires of the inner cage and the inner wires of the outer cage being circumferentially offset one from the other, and V-shaped wire sections secured at their apices to longitudinally spaced apart portions of the inner wires of the outer cage with the arms of the V extending outwardly angularly therefrom, the filter bag extending sequentially outwardly about the outer wires of the inner cage and inwardly about the inner wires of the outer cage and about the V-shaped members for support.

* * * * *